Oct. 27, 1931.  A. G. McGREGOR  1,829,600
ANÆSTHETIC HOLDING AND HEATING ACCESSORY
Filed June 26, 1930   2 Sheets-Sheet 1
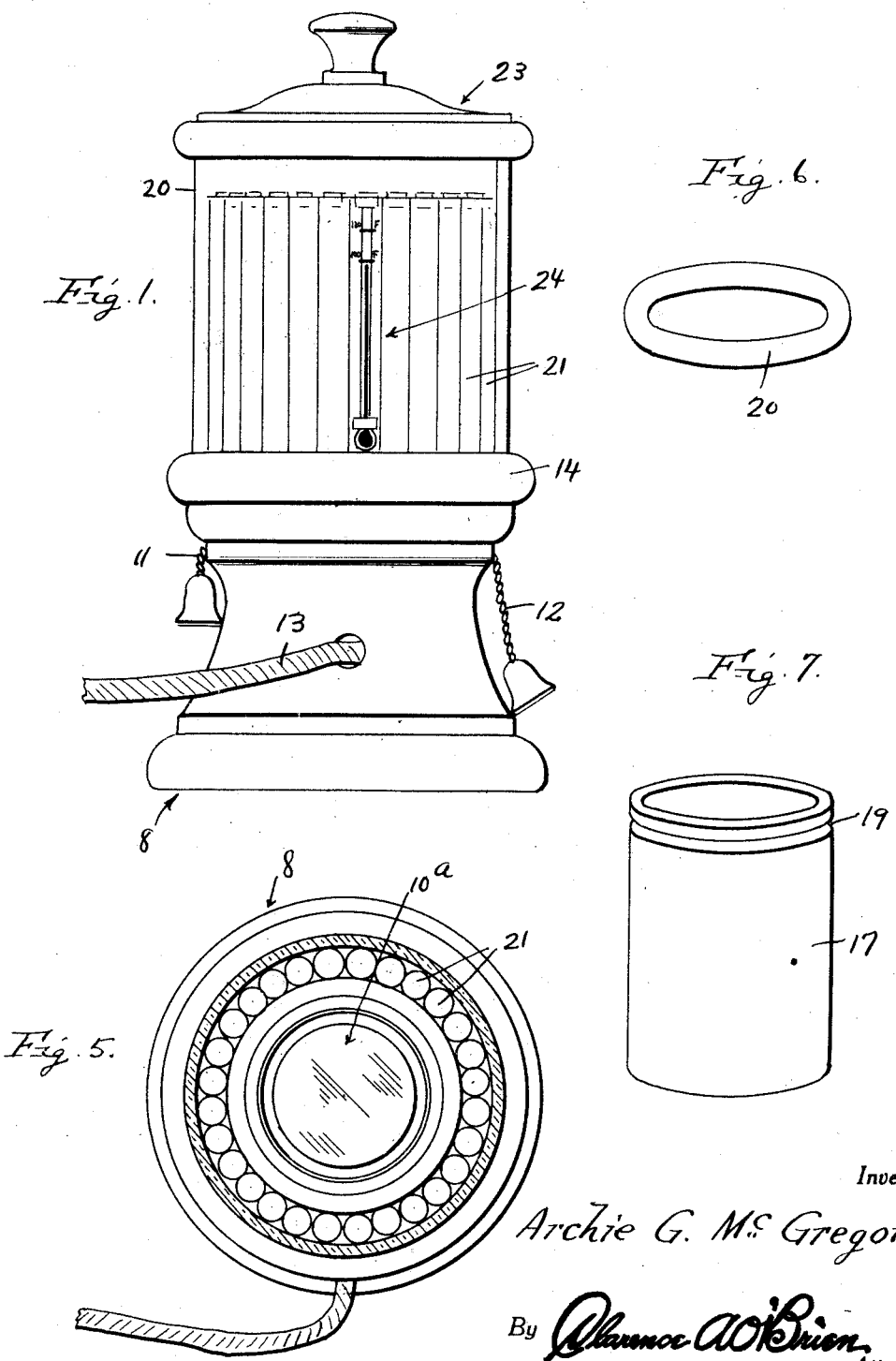
Inventor
Archie G. McGregor
By Clarence A. O'Brien
Attorney

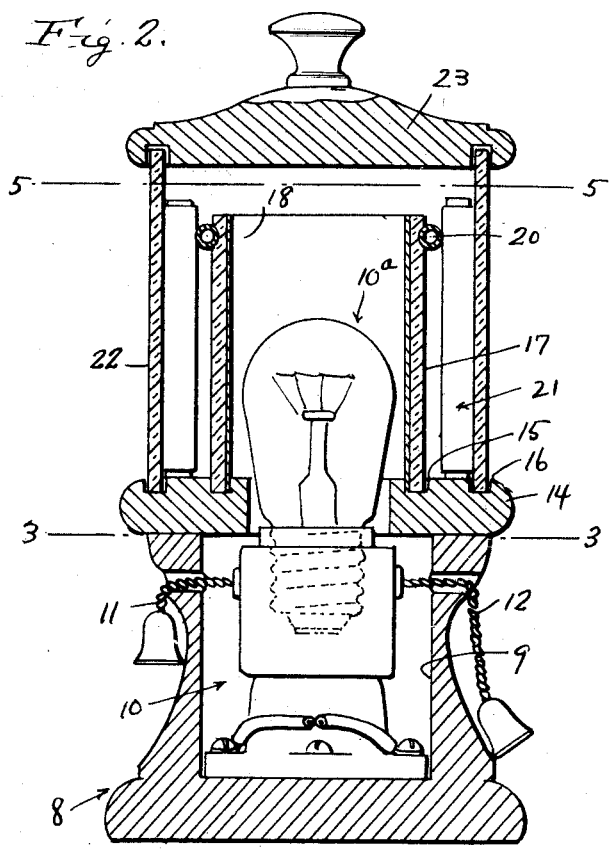
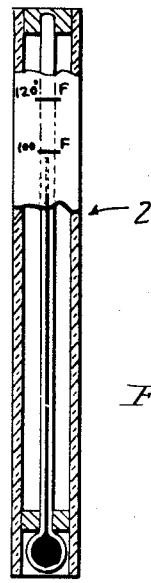
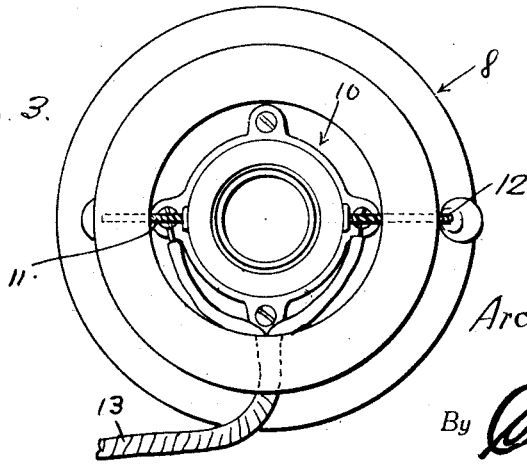

Patented Oct. 27, 1931

1,829,600

UNITED STATES PATENT OFFICE

ARCHIE G. McGREGOR, OF CALDWELL, OHIO

ANÆSTHETIC HOLDING AND HEATING ACCESSORY

Application filed June 26, 1930. Serial No. 463,988.

This invention relates to an improved accessory or appliance for holding and heating anæsthetics and it has more particular reference to a device which is primarily designed for use in dental parlors, laboratories and analogous establishments, wherein the device is designed to accommodate and heat a multiplicity of anæsthetic containing tubes.

By way of introduction, attention is invited to the fact that the present application covers certain improvements and refinements on the anæsthetic device shown and claimed in my co-pending application, Serial No. 434,638 filed under date of March 10, 1930.

In the co-pending case, as well as in the present application, the inventive conception comprehends the provision of a structure which is characterized by an electrical heating element confined within an open-ended cylinder which is surrounded by a multiplicity of perpendicular anæsthetic containing tubes held in place by a surrounding transparent casing.

One improvement embodied in the present application is in the sectional base and casing and cylinder construction, all of these parts being of separable construction to facilitate assembly, application and removal of parts.

A further feature of the invention is predicated upon the dimming socket and incandescent bulb which constitutes the adjustable heating element for heating the anæsthetic containing tubes by way of radiation.

A further distinguishing feature which characterizes the present invention is the incorporation therein of a compressible tubular annulus carried by the upper end portion of the internal cylinder and co-operating with the surrounding anæsthetic containing tubes for maintaining the tubes in perpendicular position and to prevent falling thereof when one or more of the tubes are withdrawn from the casing for use.

A distinguishing feature is also predicated upon the utilization of a thermometer of a size and shape commensurate with the anæsthetic tube to permit it to be embodied in the assembly of tubes in such a manner as to accurately maintain the desired degree of temperature, whereby to permit the anæsthetic to be heated to and beyond the body temperature for practical utilization in the laboratory.

Other features and advantages will become more readily apparent from the following description and drawings. In the drawings:

Figure 1 is a front elevational view of a device constructed in accordance with the present invention.

Figure 2 is a central vertical sectional and elevational view therethrough.

Figure 3 is a horizontal section on the line 3—3 of Figure 2.

Figure 4 is a fragmentary detail section on an enlarged scale of the registering thermometer.

Figure 5 is a horizontal section on the line 5—5 of Figure 2.

Figure 6 is a perspective view of the annular retention gasket.

Figure 7 is a perspective view of the open ended grooved cylinder.

The general assembly may well be seen in Figure 2. The pedestal portion 8 of the base is of ornamental configuration and is recessed as at 9 to provide a receptacle for the supporting base and socket 10 for the incandescent bulb 11. The chains 11 and 12 are connected with means in the socket construction for regulating the intensity of the electric current in the bulb filament. This particular kind of a socket bulb assembly is known in the trade as a dimming electric bulb and this constitutes no particular novelty except in combination with the remaining details to be hereinafter described.

Incidentally, the numeral 13 designates the current supply conductor. Seated on the top of the pedestal is an annulus denoted by the numeral 14. This is of cellular configuration and provided with inner and outer concentric grooves 15 and 16 respectively. Resting at its lower end in the inner groove 15 is an open-ended glass cylinder 17 which surrounds the projecting upper end portion of the bulb 11.

On its interior, the cylinder is provided with a removable colored paper insert 18 of translucent material which is intended for imparting an artful display. In other words, the light rays penetrating the paper 18 and the cylinder 17 will be colored as observed from the exterior. This adds to the attractiveness of the device.

The upper end portion of the cylinder is formed with an external groove 19 in which a tubular elastic rubber gasket or ring 20 is inserted. This constitutes a yieldable retention device for the various anæsthetic containing tubes generally designated by the numeral 21. These are supported in a perpendicular position so that their lower ends rest on the annulus 14 at a point between the grooves 15 and 16.

The tubes however are confined in place by a glass casing 22 whose lower end is seated in the groove 16 and whose upper end extends upwardly above the cylinder 17. The numeral 23 designates a removable cover having a groove in its bottom receiving the upper end portion of the casing. It permits ready access to be had to the interior for removing and replacing anæsthetic tubes.

These tubes are maintained in a perpendicular state between the gasket ring 20 and the inner peripheral surface of the casing 22. Embodied in this assembly is a suitable thermometer generally designated by the numeral 24 and the purpose of this is to accurately register the temperature of the anæsthetic in the tubular containers 21 so as to permit the dimming heater or bulb to be regulated as desired.

Incidentally, it is generally desired to maintain the anæsthetic in the containers at or slightly above human body temperature.

In assembling the device, the socket 10 of the electrical heater is fastened in the recess 9 of the pedestal portion 8 of the base. Then the annulus 14 is placed on the crown portion of the pedestal in the position seen in Figure 2. Next the threaded end portion of the bulb 11 is passed through the opening in the annulus and tapped into the socket. Then the cylinder 17 is seated in the groove 15 to surround the projecting portion of the bulb 11.

With the casing 22 seated in the groove 16, the device is ready for reception of the various tubes 21 as well as the thermometers 24. The tubes may be placed in the annular compartment between the cylinder 17 and the inner wall of the casing and the transparency of the tubes and liquid as well as the transparency of the cylinder and casing makes it possible for the tubes to be reviewed in an artistic manner from the exterior of the device.

The colored paper 8 on the interior of the cylinder adds to the effective color display.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a structure of the class described, a support embodying a base including a recessed pedestal, an electric bulb socket mounted in the recessed portion of the pedestal, an annulus seated on the upper end of the pedestal and provided with concentric inner and outer grooves, a bulb tapped into said socket and projecting upwardly and beyond the central opening in said annulus, an open-ended cylinder seated at its lower end in said inner groove, an open-ended casing seated at its lower end in the outer groove and defining an annular anæsthetic tube containing compartment between itself and the cylinder, the upper end of the casing extending beyond the corresponding end of the cylinder, and a removable cover provided at its bottom with a groove receiving the upper edge portion of the casing.

2. In a structure of the class described, a base, a casing mounted thereon, a cylinder disposed in said casing in spaced relation thereto to provide a compartment therebetween to accommodate anæsthetic containers to be heated, a heater on the base projecting into the cylinder, and an elastic retention swing surrounding the cylinder and cooperating with the tubes for maintaining the tubes in perpendicular relationship.

3. In a structure of the class described, a support, a casing on the suport, a cylinder on the support in spaced relation to the casing defining an annular compartment, an elastic retainer on the cylinder projecting into said chamber, and a plurality of individually removable anæsthetic containers in said chamber held individually in place by said elastic retainer, together with a thermometer embodied in the assembly of anæsthetic containers to aid in regulating the temperature.

In testimony whereof I affix my signature.

ARCHIE G. McGREGOR.